United States Patent [19]

Senatro

[11] Patent Number: 4,464,814
[45] Date of Patent: Aug. 14, 1984

[54] CLAMP

[75] Inventor: Clement A. Senatro, Newington, Conn.

[73] Assignee: United Technologies Corporation, Hartford, Conn.

[21] Appl. No.: 316,027

[22] Filed: Oct. 28, 1981

[51] Int. Cl.³ ............................................. B65D 63/02
[52] U.S. Cl. .................................... 24/279; 24/20 EE; 24/23 R
[58] Field of Search ............... 24/20 R, 20 LS, 20 W, 24/20 S, 20 CW, 23 R, 24, 20 EE, 278, 279, 20 TT

[56] References Cited

U.S. PATENT DOCUMENTS

| | | | |
|---|---|---|---|
| 381,426 | 4/1888 | Sargent | 24/20 LS |
| 1,031,188 | 7/1912 | Law | 24/20 TT |
| 2,423,627 | 7/1947 | Tinnerman | 24/23 R |
| 2,440,260 | 4/1948 | Gall | 24/20 CW |
| 3,159,708 | 12/1964 | Deal | 24/20 LS |
| 3,189,961 | 6/1965 | Heller | 24/20 TT |

FOREIGN PATENT DOCUMENTS

| | | | |
|---|---|---|---|
| 858173 | 12/1952 | Fed. Rep. of Germany | 24/20 CW |
| 778861 | 7/1957 | United Kingdom | 24/20 CW |

Primary Examiner—Richard J. Johnson
Attorney, Agent, or Firm—Norman Friedland

[57] ABSTRACT

This invention relates to clamps of the type utilized on aircraft and aircraft power plants that anchor the various tubes associated therewith and are characterized by including a bulbous section in a standardized clamp that serves to relieve the high stresses that otherwise cause breakage and looseness.

7 Claims, 3 Drawing Figures

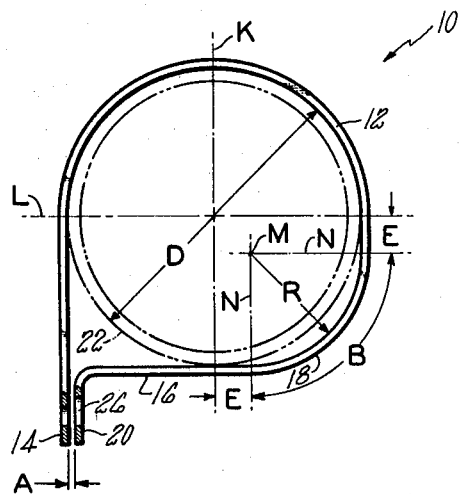
FIG. 1
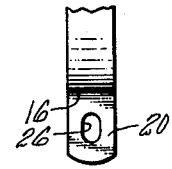
FIG. 2
FIG. 3

CLAMP

TECHNICAL FIELD

This invention relates to clamps of the type that are standardized for usage on aircraft and aircraft engines and particularly those classified as clamp loop cushioned, clamp loop cushioned joggled and clamp loop type (heat resistant).

BACKGROUND ART

As is well known, the clamps that are utilized to anchor tubes in aircraft and aircraft engine installations have been standardized and hence any modification thereto has to be done within the confines of the given dimensions. Hence, the entire aircraft industry is geared to dimension associated parts to accommodate these standardized clamps.

This invention is particularly limited to the body of clamps classified as clamp loop cushioned, clamp loop cushioned joggled and clamp loop type (heat resistant). A characteristic of this type of clamp is that its inside diameter is equal to the outside diameter of the tube and that the gap spaced between the mating ends is intended to be closed when the clamp is fastened. Inherent in this design is the fact that when fastened, the stresses on the clamp and particularly at the right angle bend is at an extremely high level. It is because of these high stresses that these clamps are known to crack and become loose over a period of use.

Another problem inherent in the design of these heretofore known clamps is that when the clamp is opened to circumscribe the tube intended to be fastened, the deformation and resiliency characteristics are such that the complimentary holes (used for securing purposes) generally always misalign. Although this problem has remained, the industry has combated it by developing a special tool that forces the alignment of these holes when in the assembled condition. Enlarging one of the holes to compensate for the misalignment problem created problems of its own. Namely, it aggravated the bend at the right angle bend of the clamp resulting in the weakening of the clamp and interfering with the placement of a tightening tool used to fasten the clamp.

I have found that I can obviate the problems discussed above and stay within the confines of the dimensions that have been standardized within the industry. I provide a judiciously located radius to the clamp body that is discretely dimensioned so as to minimize or substantially eliminate the stresses when the clamp is in the fastened condition.

DISCLOSURE OF INVENTION

An object of this invention is to provide an improved tube clamp. A feature of this invention is to provide in a clamp that has been standardized so that its envelope dimensions are unchangeable, an increased radius section adjacent the fastening end of the clamp that is bent at the 90° angle. A feature of this invention is to dimension the increased radius so that when the ends are fastened and the gap is closed this portion of the clamp becomes contiguous with the cooperating arc portion of the tube.

Other features and advantages will be apparent from the specification and claims and from the accompanying drawings which illustrate an embodiment of the invention.

BRIEF DESCRIPTION OF DRAWINGS

FIG. 1 is a side view showing the details of this invention,

FIG. 2 is a partial front view in elevation showing one of the fastening ends of the clamp 1, and FIG. 3 is a partial rear view showing the other fastened end and its complimentary opening receiving the securing means.

BEST MODE FOR CARRYING OUT THE INVENTION

As noted, the ring-like clamp generally illustrated by reference numeral 10 comprises a clamp body 12 fabricated from a relatively uniformly wide and thick metal stock into a generally loop shaped configuration. The clamp comprises a pair of fastening ends 14 and 16 where end 14 lies substantially tangential to clamp body 12 and the end 16 is substantially in line with the arcuate section 18. The end 16 is bend at right angles so that the fastening portion 20 lies parallel to end 14 but spaced a predetermined distance therefrom indicated by gap A.

The arcuate section 18 which forms the essence of this invention and its dimensions will be detailed below, is tantamount to a spring. When the clamp is fastened, i.e. the ends 14 and 20 are drawn to bear against each other to close gap A the surface underlying the arcuate section 18 (defined by reference letter B) comes into contact with the tube 22 being supported thereby. Hence, when released, i.e. when the securing means is retracted, the arcuate section 18 will return to the position illustrated, save for any hysteresis characteristic of the material.

The next portion will describe the method for calculating the dimensions of the arcuate section 18.

The dimensions are obtained by solving the following equations:

$$R = -2.332(S) + (D/2)$$

$$E = (D/2) - R$$

where:

E is the distance from the vertical center line K drawn perpendicular to the end 16 at the point of tangent to the tube 22 and the distance from the center line L formed perpendicular to the center line K at the center M of the circle.

R is the radius of the arcuate portion 18 and is circumscribed from the point M where the lines N+N intersect.

D is the outside diameter of tube 22.

S is a constant obtained by preselecting the gap A and will be selected to give the desired configuration to the arcuate portion 18. Essentially the gap size A will be larger for the larger diameter tubes.

Tube clamps built in accordance to this invention having the following constant (S) have been proven to be efficacious.

For tube sizes 0.375–0.625 inch diameter, S=0.045.
For tube sizes 0.688–1.188 inch diameter, S=0.060.
For tube sizes 1.250 and higher inch diameter, S=0.090.

Because of the lessening or elimination of the stresses on the clamp body and owing to the fact that the 90° bend remains unimpaired and the ends 14 and 20 stay substantially parallel when the clamp is fastened it has been possible to enlarge the cooperating opening 26 in the fastener's end 20. This serves to facilitate the assembly of the bolt or screw used to fasten the clamp.

As is well known, these clamps are also designed to accommodate a full or partial sheath that surrounds the metal body 12. The use of a sheath would not impair the incorporation of this invention.

It should be understood that the invention is not limited to the particular embodiments shown and described herein, but that various changes and modifications may be made without departing from the spirit and scope of this novel concept as defined by the following claims.

I claim:

1. A loop type clamp having a relatively circular shaped body in combination with a circular shaped member intended to be supported and the diameter of said relatively circular shaped body being substantially the same as the diameter of the member intended to be supported by said clamp and being formed from a unitary constant width member, a first portion extending tangent to said circular shaped body for accepting a fastener, a second complimentary portion also extending generally tangent to said circular shaped body having a right angle bend disposed in parallel relation to said first portion and spaced therefrom a predetermined distance defining a gap also accepting said fastener, said fastener tightening said clamp to said member intended to be clamped by urging said first portion and said second portion together to close said gap and means for minimizing the stress on said clamp including a bulbous section in the quadrant of the circular shaped body adjacent the said right angle bend extending radially from said member intended to be clamped and said bulbous portion being urged to be in contiguous relationship with said member intended to be clamped when said gap is eliminated, and said unitary constant width member being formed from a resilient metallic material so that when said clamp is in said clamped position the material of said bulbous section imparts a spring load to said clamp.

2. A loop type clamp as in claim 1 including in-line apertures formed in said first portion and in said second portion for accepting said fastening means.

3. A loop type clamp as in claim 2 wherein the aperture in said second portion is enlarged relative to the aperture in said first portion.

4. A loop type clamp as in claim 1 wherein the radius of the bulbous section is determined in accordance with the equations $$R = 2.331(S) + (D/2) \text{ and}$$

$$E = (D/2) - R$$

where
the value of E ascertains the center of the radius of the bulbous section by extending lines spaced from the computed distance of the vertical and horizontal center lines of said circular shaped body and the intersection of parallel lines thereto;
R is the radius of the bulbous section;
D is the outside diameter of the member intended to be supported by said clamp; and
S is a predetermined constant of said gap.

5. A loop type clamp as claimed in claim 4 where S equals 0.045 for members intended to be clamped whose diameter falls within the range of 0.375 to 0.0625 inch.

6. A loop type clamp as claimed in claim 5 where S equals 0.060 for members intended to be clamped whose diameter falls within the range of 0.688 to 1.188 inches.

7. A loop type clamp as claimed in claim 5 where S equals 0.090 for members intended to be clamped whose diameter falls within the range of greater than 1.250 inches.

* * * * *

UNITED STATES PATENT AND TRADEMARK OFFICE
CERTIFICATE OF CORRECTION

PATENT NO. : 4,464,814

DATED : August 14, 1984

INVENTOR(S) : Clement A. Senatro

It is certified that error appears in the above-identified patent and that said Letters Patent is hereby corrected as shown below:

Column 2, line 20, "bend" should be --bent--.

Column 2, line 39, "R=-2.332(S)+(D/2)" should be --R=-2.331(S)+(D/2)--.

Signed and Sealed this

Twenty-fifth Day of June 1985

[SEAL]

Attest:

DONALD J. QUIGG

Attesting Officer

Acting Commissioner of Patents and Trademarks